June 4, 1957  H. H. BLAKE, JR  2,794,257
ADJUSTABLE GAUGE HAVING FLARED JAWS
Filed Oct. 24, 1955
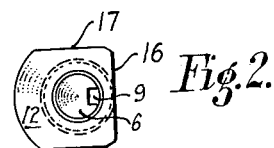
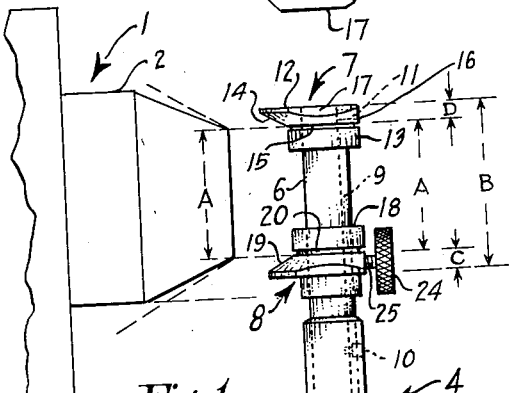
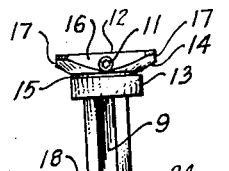
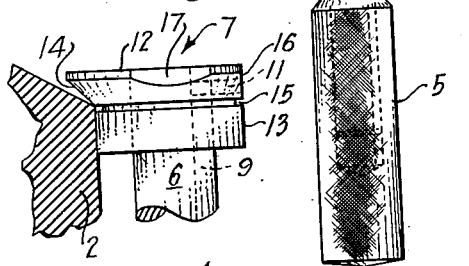
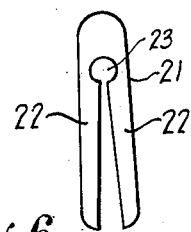
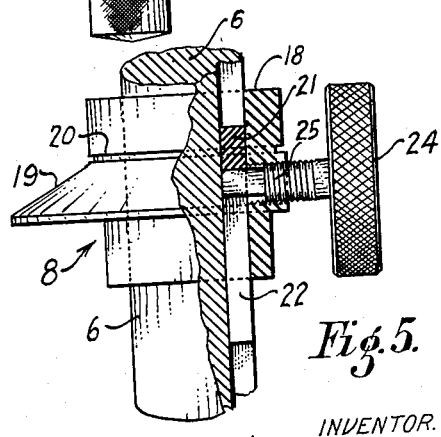
INVENTOR.
Harold H. Blake Jr.
BY
A. Schapp
ATTORNEY 2,794,257

United States Patent Office

Patented June 4, 1957

2,794,257
ADJUSTABLE GAUGE HAVING FLARED JAWS

Harold H. Blake, Jr., Los Altos, Calif.

Application October 24, 1955, Serial No. 542,275

4 Claims. (Cl. 33—143)

The present invention relates to improvements in a gauge for measuring the diameter at the small end of a taper having a flat end face.

More particularly, it is proposed to provide a gauge of the character described which comprises a pair of cooperative jaw members formed with flaring sections adapted for straddling the taper to a predetermined depth, whereby the diameter of the taper at said depth may be correctly and accurately established.

It is further proposed to provide means for calculating the diameter by providing two tapered sections with flat and parallel outer faces spaced by predetermined distances from the points of contact with the taper, so that the said diameter may be determined by deducting the said two distances or spacings from the overall distance between the two flat faces.

It is additionally proposed to combine the features referred to into a simple tool or implement easily carried in the pocket or in a case, readily adjusting itself to the proper opening corresponding to the diameter of the taper and formed with flaring sections adapted for a considerable range of tapers.

Further objects and advantages of my gauge for measuring the diameter of a small end of a taper will appear as the specification proceeds and the new and novel features of the invention will be fully defined in the claims attached hereto.

The preferred form of my invention is illustrated in the accompanying drawing, forming part of this application, in which:

Figure 1 shows a side view of my gauge, in juxtaposition to a taper to be measured;

Figure 2, an end view of the gauge;

Figure 3, a side view taken at a right angle to that of Figure 1;

Figure 4, an enlarged fragmentary view showing one jaw of my gauge as applied to a taper;

Figure 5, a sectional detail view, on an enlarged scale, showing a combination friction and positive locking means for one of the jaw used in my gauge; and Figure 6, a detail view of a friction key used in connection with the latter jaw.

While I have shown only the preferred form of my invention, I wish to have it understood that various changes or modifications may be made within the scope of the claims attached hereto, without departing from the spirit of the invention.

Referring to the drawing in detail, the taper to be measured is shown at 1 as being shaped upon the end of a rod 2 having a fixed diameter, at an angle of 30 degrees, and having a small diameter A to be ascertained by means of my gauge.

The gauge, generally identified by the numeral 4, comprises in its general features, a straight handle 5, a shaft 6 adjustably mounted therein so as to extend from one end thereof, a jaw 7 fixedly mounted upon the free end of the shaft, and a second jaw 8 mounted adjustably on the shaft, in juxtaposition to the fixed jaw.

The handle 5 may be of any suitable construction, and is preferably cylindrical and knurled in part, for convenience of operation.

The shaft 6 extends into the handle to a desired degree and is formed with a longitudinal groove 9, into which extends a set screw 10 threaded into the handle and holding the shaft against longitudinal and turning movement.

The outer end of the shaft has the jaw 7 mounted thereon, the jaw being held in place by a set screw 11 and having a flat outer face 12 arranged transversely to the shaft. The jaw comprises a cylindrical shoulder 13 and a flaring section 14, with the flare projecting beyond the shoulder, and preferably separated therefrom by a small annular groove 15, which latter is merely intended to eliminate any small inaccuracies which might otherwise be present at the point between the collar and the tapered section.

One side of the tapered section not in actual use may be cut away along a straight line, as at 16, and the same applies to the two sides 17 arranged at right angles to the straight line 16.

The jaw 8 is of a shape similar to that of jaw 7 and comprises a cylindrical shoulder 18 of the same diameter as the shoulder 13, and a flaring section 19 made of the same dimensions as section 14, the two flaring sections being arranged in confronting relation.

A small groove 20 is interposed between the shoulder 18 and the flaring section 19. The flaring section is cut away in the same manner as the corresponding section of the fixed jaw.

The second jaw is free to slide on the shaft 6, but is held resiliently in any position to which it has been adjusted by means of a key 21 (see Figure 6), which is slidable in the groove 9 and has two spaced legs 22 resiliently bearing against the side walls of the groove.

The key 21 is also formed with a round hole 23 in the body portion thereof, and the end of a set screw 24 threaded into the jaw, as at 25, engages in the hole 23 to lock the key to the jaw. As long as the set screw does not bear against the bottom of the groove 9, the jaw is free to slide against the frictional resistance offered by the springy legs 22 of the key bearing against the sides of the groove.

This frictional resistance will cause the jaw to stay in any position to which it may have been adjusted, but will yield to pressure brought to bear in applying the gauge. When the set screw 24 is screwed down to tightly engage against the bottom of the groove, the jaw is locked in position positively.

The flaring sections 14 and 19 are shaped to form an angle with the centerline of the work or taper 1 somewhat in excess of the angle of the taper 1. If the angle of the taper, for instance is 30 degrees, the angle of the flaring sections should be at least slightly greater, say 31 degrees, but may be considerably greater, so that each set of flaring sections may be operable on a considerable range of tapers.

The principal requirement is that, when the flaring sections are brought into juxtaposition with respect to the taper 1, as shown in Figure 1, and are made to straddle the taper to the depth of the shoulders 13 and 18, there is only a single point of contact between the base of each flaring section and the small rim of the taper, these points of contact lying in a plane tangential to both shoulders 13 and 18. From these points of contact the flaring sections flare away from the taper.

To allow each set of flaring sections to cover a considerable range, the following schedule may be adopted:

| Angle of taper, degrees: | Angle of flaring sections, degrees |
|---|---|
| 0 to 15 | 16 |
| 15 to 30 | 31 |
| 30 to 45 | 46 |

The points of contact are determined by the circumferences of the shoulders and the spacing between these points of contact is indicated by the line A. This spacing, when the gauge has been properly applied to the taper, will correspond exactly to the diameter of the small end of the taper.

The points of contact are spaced from the flat and parallel outer faces of the two flaring sections of the jaws by fixed distances, indicated by the lines C and D in Figure 1, say .150 of an inch. The overall distance between the two outer faces of the flaring sections is indicated by the line B, and can be ascertained by means of any suitable micrometer.

Thus, when the flaring sections of the gauge have been properly adjusted with respect to a given taper, the diameter at the small end of the taper may be readily established by taking the overall measurement of the distance B and deducting therefrom the two constants C and D, under the formula A equals B minus (C plus D).

In operation, the machinist first loosens the set screw and adjusts the lower jaw so that the spacing between the bases of the flaring sections is visibly less than the small diameter of the taper.

He then takes the taper in one hand, the handle of the gauge in the other hand and guides the flaring sections over the taper in a gentle side sweep. During this movement, he exerts inward pressure to cause the shoulders 13 and 18 to bear on the outer face of the taper, and also downward pressure to cause the flaring section of the fixed jaw to maintain contact with the upper portion of the taper.

This will cause the lower jaw to retract until the span between the two points of contact corresponds exactly to the diameter of the small end of the taper.

Next, he measures the distance B between the two outer jaw faces and deducts the two constants C and D, the resulting figure giving the exact diameter of the small end of the taper.

I claim:

1. A gauge for measuring the diameter at the small end of a taper, comprising a handle, and a pair of jaws carried by the handle and having outwardly flaring sections adapted for straddling said end, the flaring sections having an angularity greater than that of the taper so as to allow the sections to enter upon the taper, and the jaws having means bearing on the outer end of the taper to limit the entry of the flaring sections upon the taper, the said limiting means comprising symmetrical collars carried by the jaws inside of the flaring sections.

2. In a gauge of the character described, a handle having a straight end, a jaw fixed upon the end of the handle and having a flaring section and a collar inwardly of the latter, a second jaw slidable upon the handle and having a confronting flaring section and a collar inwardly of the latter, the two flaring sections being adapted for straddling the small end of a taper to the depth of the collars.

3. In a gauge of the character described, a handle having a straight end, a jaw fixed upon the end of the handle and having a flaring section and a collar inwardly of the latter, a second jaw slidable upon the handle and having a confronting flaring section and a collar inwardly of the latter, the two flaring sections being adapted for straddling the small end of a taper to the depth of the collars, and the two flaring sections having parallel outer faces with fixed spacing between the said outer faces and the tapers to the depth of the collars, whereby the diameter of the small end of a taper interposed between the flaring sections to the depth of the collars may be calculated by deducting the sum of the said spacings from the overall distance between the flat outer faces.

4. In a gauge of the character described, a handle having a straight end, a jaw fixed upon the end of the handle and having a flaring section and a collar inwardly of the latter, a second jaw slidable upon the handle and having a confronting flaring section and a collar inwardly of the latter, the two flaring sections being adapted for straddling the small end of a taper to the depth of the collars, the slidable jaw having yielding means for holding the jaw against sliding movement and having also means for fixedly locking the same in position on the handle.

References Cited in the file of this patent

UNITED STATES PATENTS

| 2,529,931 | Gallup | Nov. 14, 1950 |
| 2,537,473 | McCusker | Jan. 9, 1951 |

FOREIGN PATENTS

| 650,588 | Great Britain | Feb. 28, 1951 |